US008762317B2

(12) United States Patent (10) Patent No.: US 8,762,317 B2
Sahibzada et al. (45) Date of Patent: Jun. 24, 2014

(54) SOFTWARE LOCALIZATION ANALYSIS OF MULTIPLE RESOURCES

(75) Inventors: Ali Raza Sahibzada, Bellevue, WA (US); Michael Joseph Eatherly, Puyallup, WA (US)

(73) Assignee: Microsoft Corporation, Redmond, WA (US)

( * ) Notice: Subject to any disclaimer, the term of this patent is extended or adjusted under 35 U.S.C. 154(b) by 281 days.

(21) Appl. No.: 12/938,194

(22) Filed: Nov. 2, 2010

(65) Prior Publication Data

US 2012/0109869 A1 May 3, 2012

(51) Int. Cl.
*G06N 5/02* (2006.01)
*G06F 9/44* (2006.01)
*G06F 11/36* (2006.01)
*G06F 17/00* (2006.01)

(52) U.S. Cl.
CPC ............... *G06N 5/02* (2013.01); *G06F 9/4448* (2013.01); *G06F 11/3604* (2013.01)
USPC ................................................ 706/47; 704/2

(58) Field of Classification Search
CPC ...... G06N 5/02; G06F 9/4448; G06F 11/3604
See application file for complete search history.

(56) References Cited

U.S. PATENT DOCUMENTS

| 5,664,206 | A | 9/1997 | Murow et al. |
| 7,103,875 | B1 | 9/2006 | Kaneko et al. |
| 2002/0156799 | A1* | 10/2002 | Markel et al. ................. 707/202 |
| 2006/0116864 | A1 | 6/2006 | McHugh et al. |
| 2006/0156278 | A1 | 7/2006 | Reager |
| 2006/0248071 | A1* | 11/2006 | Campbell et al. ................. 707/5 |
| 2008/0019281 | A1* | 1/2008 | Liger et al. .................... 370/252 |
| 2008/0127103 | A1* | 5/2008 | Bak ................................ 717/126 |
| 2009/0112577 | A1* | 4/2009 | Gifford et al. ..................... 704/9 |
| 2009/0182744 | A1 | 7/2009 | Arning et al. |
| 2009/0276206 | A1* | 11/2009 | Fitzpatrick et al. ............... 704/2 |
| 2009/0300592 | A1* | 12/2009 | Joyce ............................ 717/154 |
| 2009/0327002 | A1 | 12/2009 | Chapman et al. |

OTHER PUBLICATIONS

"Localization Testing", Retrieved at << http://www.lionbridge.com/lionbridge/en-us/services/localization-translation/localization-testing.htm >>, Retrieved Date: Sep. 1, 2010, p. 1.
"Localization & Internationalization Testing", Retrieved at << http://www.moraviaworldwide.com/en/services/testing-engineering/localization-and-internationalization-testing/>>, Retrieved Date: Sep. 1, 2010, pp. 3.

* cited by examiner

*Primary Examiner* — Jeffrey A Gaffin
*Assistant Examiner* — Mikayla Chubb
(74) *Attorney, Agent, or Firm* — Bryan Webster; Andrew Sanders; Micky Minhas

(57) ABSTRACT

Various embodiments provide techniques for analyzing resources based on a set of rules to determine problems that may occur during a product (e.g., a software product) development cycle. In accordance with some embodiments, resources can include files, strings, images, text, user interface elements (e.g. controls, radio buttons, and/or windows), and so on. In at least some embodiments, a resource analysis utility ("RAU") is provided that can load resource files and analyze associated resources according to a set of rules. According to some embodiments, the RAU includes a graphical user interface ("GUI") that enables resource files to be selected and rules to be selected that are to be used to analyze the resource files. The GUI can also include results of the analysis of the resource files.

20 Claims, 13 Drawing Sheets

| Resource Type | Res File Name | Target Culture | Rule | Result | Explanation |
|---|---|---|---|---|---|
| Table | AppAtable1.res | JP | Do not localize | Localized | Resource localized |
| Table | AppAtable2.res | JP | Do not localize | Warning | String includes a non-standard place holder |
| Table | AppAtable4.txt | JP | Do not localize | Warning | No comments |
| Control | AppActrl1.lspkg | JP | LocaleSensitive | Warning | String includes non-standard placeholder |
| Control | AppActrl2.txt | JP | LocaleSensitive | Warning | String includes a non-standard placeholder |
| Control | AppActrl4.txt | JP | LocaleSensitive | Warning | No comments |

Fig. 4

| Resource Type | Resource String | Arabic | Arabic-psloc-sa | Japanese |
|---|---|---|---|---|
| 5 | Windows Live Mail Imp... | ويندوز لايف Windows Live | ƻWindows Ɠive Mȧil [m... | Windows Live メール... |
| 5 | Windows Live Mail Imp... | ويندوز لايف Windows Live | ƻWindows Ɠive Mail L... | Windows Live メール... |
| "WIN_DLG_CTRL_: 1... | &Request a read rec... | طلب تاكيد قراءة... | &Request a read re... | 返信するメッセージ... |
| "WIN_DLG_CTRL_: 1... | &Secure Receipts... | توكيدات مؤمنة... | &Șe̓cure Receipts... | セキュリティで保護さ... |
| "WIN_DLG_CTRL_: 1... | &Never send a read re... | عدم إرسال تأكيد قراءة... | &Never send a read r... | 開封確認メッセージを... |
| "WIN_DLG_CTRL_: 1... | N&otify me for each re... | إعلامي لكل رسالة قراءة... | &Ňotify me for each r... | 開封確認メッセージを... |
| "WIN_DLG_CTRL_: 1... | Al&ways send a r... | دائماً إرسال تأكيد... | &Ąlways send a re&... | メーリングリストへの... |
| "WIN_DLG_CTRL_: 1... | Unless it is sent to a &... | ما لم يتم إرسالها إلى... | &Ụnless it is sent to a &... | セキュリティで保護さ... |
| "WIN_DLG_CTRL_: 1... | Secure Receipts | التوكيدات المؤمنة... | &Șecure Receipts ʃὸ | セキュリティで保護さ... |
| "WIN_DLG_CTRL_: 6... | Secure receipts allow y... | تسمح التوكيدات المؤمنة... | &Secure receipts allow... | |
| 5 | Receipts | تاكيدات... | &Receipts ʃὸ | 確認メッセージ... |
| 5 | Windows Live Mail Imp... | ويندوز لايف Windows Live | &Windows Ɠivȇ Mail Im... | Windows Live メール... |
| 5 | Windows Live Mail Imp... | ويندوز لايف Windows Live | &Windows Ɠivȇ Mail Im... | Windows Live メール... |
| 5 | Options | خيارات... | &Options ʃὸ | オプション |

Fig. 5

| Resource | Aspect | Value |
|---|---|---|
| Added a blog entry {{0}}{{1}}{{2}} | Translation | Blogginlagget {{1}} uppdaterades |
| Added a blog entry {{0}}{{1}}{{2}} | Length | 32 |
| Added a blog entry {{0}}{{1}}{{2}} | Width | 300.444 |
| Added a blog entry {{0}}{{1}}{{2}} | Height | 28.70833 |

Fig. 6

| File Name | Resource Type | Statistics Field | Statistic Values - Arabic | Statistic Values - Japanese |
|---|---|---|---|---|
| Mail.wxl.lcl | Word | Total | 6 | 14 |
| Mail.wxl.lcl | String | Localized | 73 | 73 |
| Mail.wxl.lcl | Word | Localized | 86 | 86 |
| Mail.wxl.lcl | String | Updated | 3 | 12 |
| Mail.wxl.lcl | Word | Updated | 8 | 3 |
| Mail.wxl.lcl | String | Not Localized | 43 | 41 |
| Mail.wxl.lcl | Word | Not Localized | 18 | 18 |
| Msg.wxl.lcl | Type | Do not localize | 0 | 0 |
| Msg.wxl.lcl | Type | Menu | 7 | 7 |
| Msg.wxl.lcl | Type | Dialog | 12 | 12 |

Fig. 7

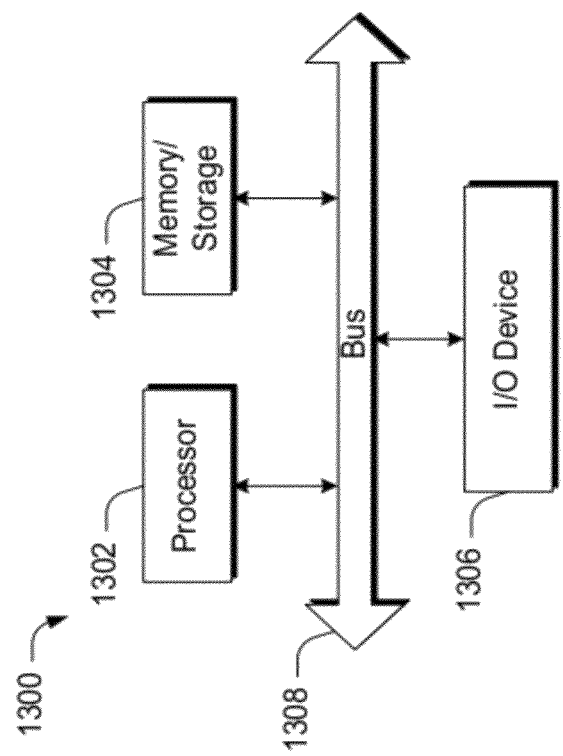

SOFTWARE LOCALIZATION ANALYSIS OF MULTIPLE RESOURCES

BACKGROUND

Products that are released are often associated with a number of different versions that each targets a specific geographic location. For example, a software product can have a number of different versions, with each version being translated into a different language that corresponds to a specific geographic location and/or culture. This aspect of the product cycle is often referred to as localization. Problems can arise, however, when aspects of a software product are translated from one language to another. For example, a visual element associated with a graphical user interface can be improperly scaled after translation such that the visual element is not displayed properly within the graphical user interface. As another example, text associated with a software product can be mistranslated during the translation process. A mistranslation can cause problems with the functionality of the software product, such as software breakage or a software crash. Legal and/or political problems can also arise from mistranslation, such as the inclusion of a trademarked term in violation of trademark laws in a particular jurisdiction.

Current ways of detecting these and other problems that can arise during product localization are typically error-prone and labor-intensive. For example, some techniques require a user to manually enter all resources that are to be analyzed and are capable of analyzing only one resource at a time.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide techniques for analyzing resources based on a set of rules to determine problems that may occur during a product development cycle. In accordance with some embodiments, resources can include files, strings (e.g., code strings), images, text, user interface elements (e.g. controls, radio buttons, and/or windows), and so on. For example, a resource for a software product can include a selectable control that is included as part of a graphical user interface for the software product.

In at least some embodiments, a resource analysis utility ("RAU") is provided that can load resource files and automatically analyze associated resources according to a set of rules. According to some embodiments, the RAU includes a graphical user interface ("GUI") that enables resource files to be selected and rules to be selected that are to be used to analyze the resource files. The GUI can also include results of the analysis of the resource files. For example, the GUI can display a table that includes the resource files that were analyzed, the rules that were used to analyze the resource files, problems that were detected during the analysis, and so on.

BRIEF DESCRIPTION OF THE DRAWINGS

The same numbers are used throughout the drawings to reference like features.

FIG. 4 illustrates a report area of a resource analysis utility graphical user interface in accordance with one or more embodiments.

FIG. 5 illustrates a master resource table of a resource analysis utility graphical user interface in accordance with one or more embodiments.

FIG. 6 illustrates a details table in accordance with one or more embodiments.

FIG. 7 illustrates a statistics table in accordance with one or more embodiments.

FIG. 13 illustrates an example system that can be used to implement one or more embodiments.

DETAILED DESCRIPTION

Overview

Figure 1:
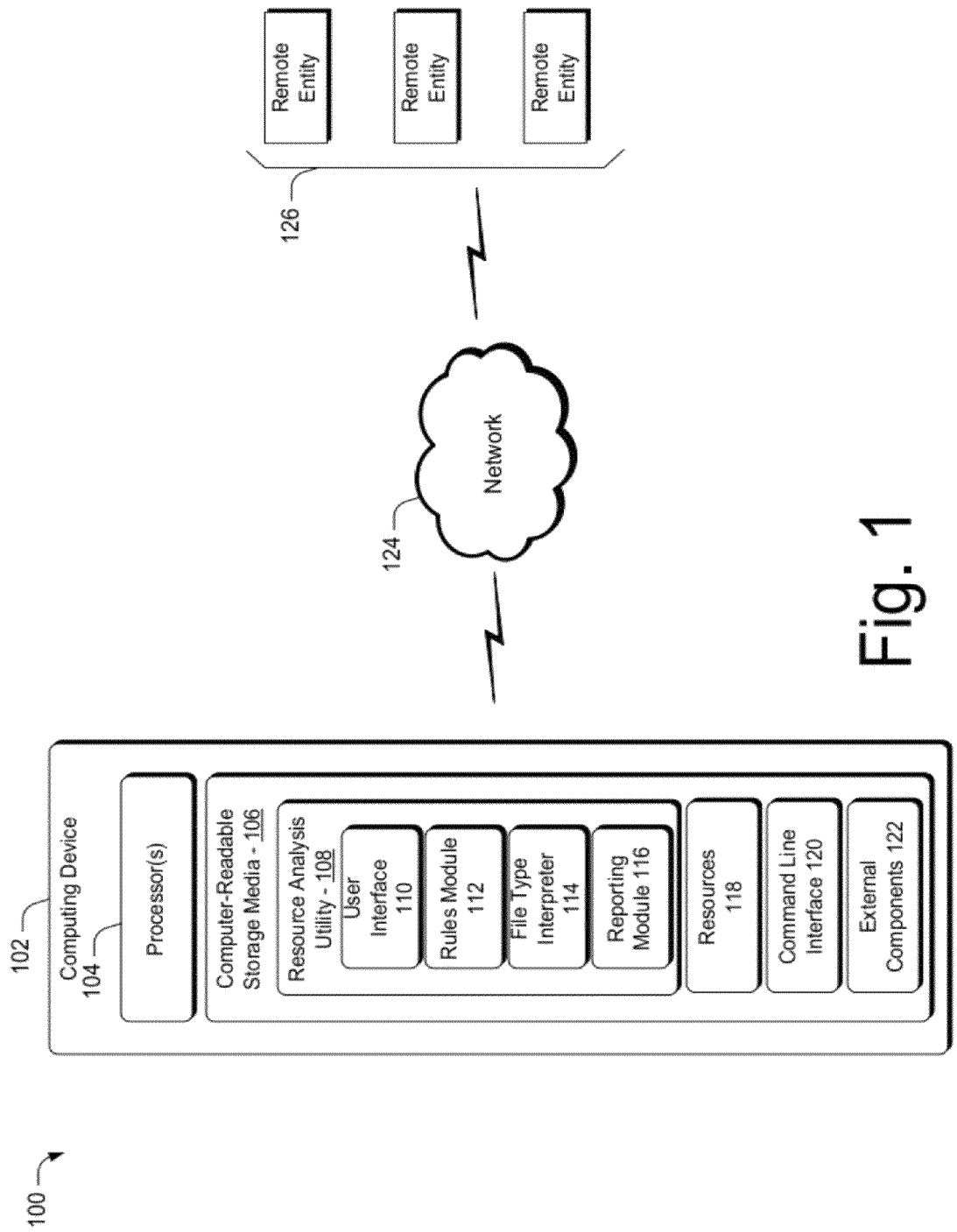
FIG. 1 illustrates an operating environment in which various principles described herein can be employed in accordance with one or more embodiments.

Various embodiments provide techniques for analyzing resources based on a set of rules to determine problems that may occur during a product development cycle. In accordance with some embodiments, resources can include files, strings, images, text, user interface elements (e.g. controls, radio buttons, and/or windows), and so on. For example, a resource for a software product can include a selectable control that is included as part of a graphical user interface for the software product.

In at least some embodiments, a resource analysis utility ("RAU") is provided that can load resource files and analyze associated resources according to a set of rules. According to some embodiments, the RAU includes a graphical user interface ("GUI") that enables resource files to be selected and rules to be selected that are to be used to analyze the resource files. The GUI can also include results of the analysis of the resource files. For example, the GUI can display a table that includes the resource files that were analyzed, the rules that were used to analyze the resource files, problems that were detected during the analysis, and so on.

In an example implementation, a user can launch the GUI and select resource files to be analyzed. The user can then select rules to be run on the selected resource files. Examples of rules that can be used to analyze resources are provided below. The RAU can then run an analysis of the selected resource files using the selected rules. In at least some embodiments, results of the analysis can be displayed via the GUI.

In at least some embodiments, the RAU can be implemented via a command line interface. For example, a user can invoke the RAU using a command line interface and then enter command line arguments that specify resource files to be analyzed and rules to be used for the analysis. This aspect of the RAU is discussed in more detail below.

In the discussion that follows, a section entitled "Operating Environment" is provided and describes one environment in which one or more embodiments can be employed. Following this, a section entitled "Example Resource Analysis Scenario" describes an example resource analysis scenario in accordance with one or more embodiments. Next, a section entitled "Example User Interfaces" describes example user interfaces that can be used to analyze resources in accordance with one or more embodiments. Following this, a section entitled "Example Command Line Interface" describes example ways of resource analysis utilizing a command line interface in accordance with one or more embodiments. Next, a section entitled "Example Methods" describes example methods in accordance with one or more embodiments. Following this, a section entitled "Example Rules" discusses example rules that can be used to analyze resources in accordance with one or more embodiments. Last, a section entitled "Example System" describes an example system that can be utilized to implement one or more embodiments.

Operating Environment

FIG. 1 illustrates an operating environment in accordance with one or more embodiments, generally at 100. Environment 100 includes a computing device 102 having one or more processors 104 and one or more computer-readable storage media 106. The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 13.

In addition, computing device 102 includes a module in the form of a resource analysis utility 108 that can be utilized to analyze a variety of different resources. The resource analysis utility (RAU) includes and/or makes use of a user interface 110, a rules module 112, a file type interpreter 114, and a reporting module 116. According to some embodiments, the user interface can be used to interact with the RAU via a variety of different user interfaces, e.g., graphical user interfaces. In at least some embodiments, the rules module includes a variety of different rules that can be selected and/or used to analyze resources.

According to some embodiments, the file type interpreter 114 is capable of receiving resource files in a variety of different formats and interpreting the resource files such that they can be analyzed by the RAU. For example, the file type interpreter can include a variety of different file type wrappers that can each determine a file type associated with a specific resource file and interpret data within the resource file according to rules and/or logic associated with a respective file type wrapper. Examples of file types that can be interpreted by the file type interpreter include, by way of example and not limitation, text files, media files (e.g., video, audio, and so on), image files, markup language files, and so on.

According to at least some embodiments, the reporting module 116 is configured to report the results of resource analysis in a variety of different ways. For example, the reporting module can generate a table that lists the resources that were analyzed, the rules that were run during the analysis, and the results of the analysis. The reporting module can also flag resources and/or rules that may be associated with potential problems, e.g., problems that may occur when a particular resource is localized.

The computing device 102 also includes resources 118, a command line interface 120, and external components 122. According to some embodiments, the resources 118 include a variety of different resources, such as files, images, strings, text elements, and so on. For example, the resources 118 can include a graphical element that is included as part of an application's graphical user interface.

In at least some embodiments, the command line interface 120 presents one example way in which the RAU can be invoked. Example implementations of the RAU via the command line interface are discussed below. According to some embodiments, the external components 122 can include a variety of different external components from which the RAU can retrieve information and to which the RAU can report. For example, the external components can include a bug filer to which the RAU can report a problem that was detected during an analysis of a resource.

In addition, environment 100 includes a network 124, such as the Internet, and one or more remote entities 126 with which the RAU can communicate. Examples of the remote entities 126 include a remote web server, a cloud computing resource, and so on. In some example embodiments, the RAU can retrieve rules and/or resources from the remote entities. Further to some embodiments, the RAU can also report resource analysis results to the remote entities.

Computing device 102 can be embodied as any suitable computing device such as, by way of example and not limitation, a desktop computer, a portable computer, a handheld computer such as a personal digital assistant (PDA), cell phone, and the like.

Having described an example operating environment, consider now a discussion of an example resource analysis scenario utilizing the techniques and tools discussed herein.

Example Resource Analysis Scenario

Figure 2:
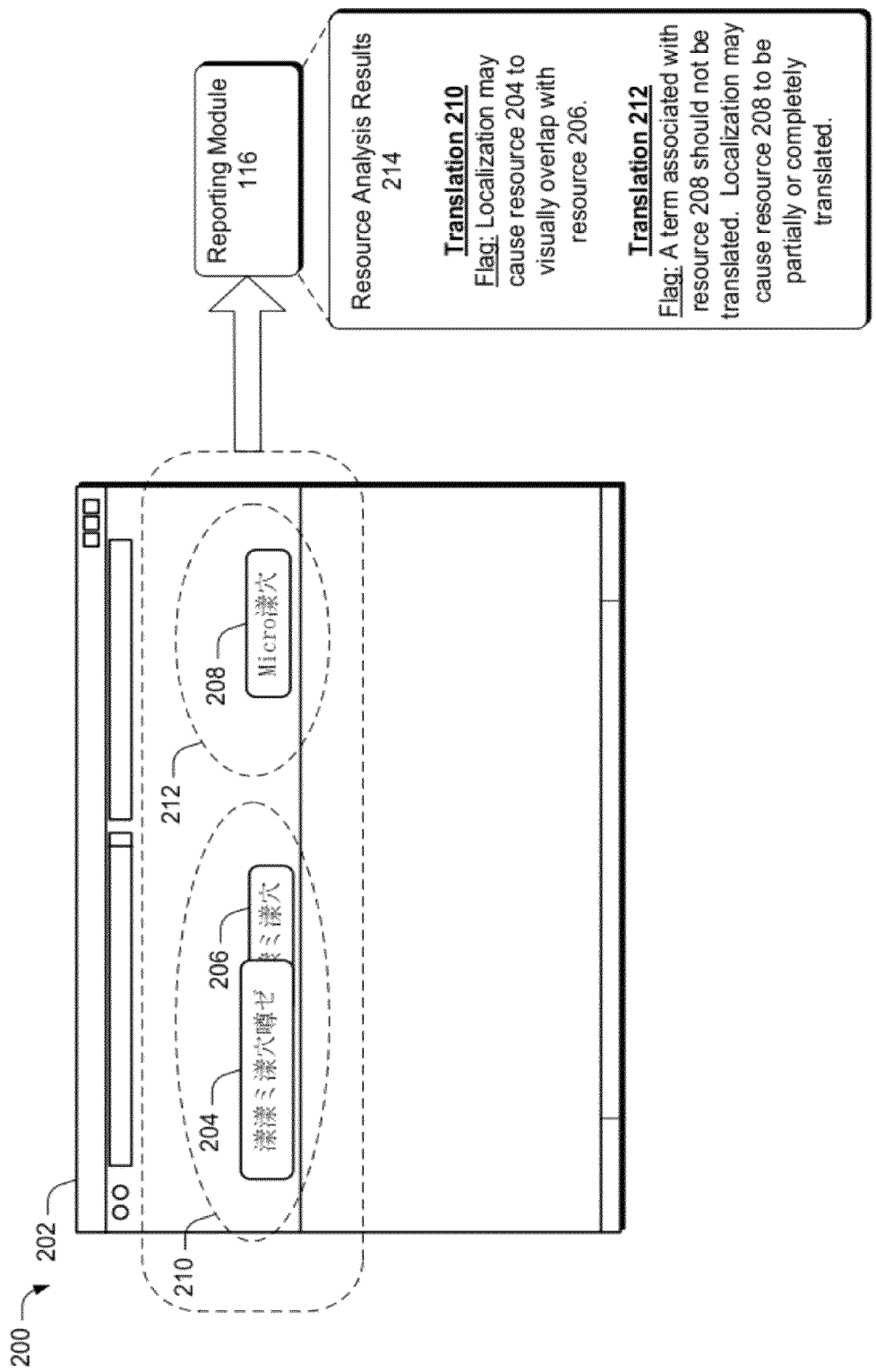
FIG. 2 illustrates an example resource analysis scenario in accordance with one or more embodiments.

FIG. 2 illustrates an example resource analysis scenario utilizing techniques and/or tools discussed herein, generally at 200. The resource analysis scenario 200 includes a display interface 202 that can be associated with a variety of different applications, such as a web browser, an enterprise application, a word processing application, mobile applications, and so on. As part of the display interface are several resources, including resources 204, 206, and 208. In at least some embodiments, the resources 204, 206, and 208 can be created according to a first language and/or culture, e.g., English. When the resources are translated into a second language (e.g., as part of a localization process), a number of different problems can occur.

For example, a translation 210 illustrates that when the resources 204 and 206 are translated as part of a localization process, the resource 204 overlaps and partially obscures the resource 206. In some embodiments, this can be considered undesirable as it can detract from the visual appeal and usability of the display interface 202. As another example, a translation 212 illustrates that when the resource 208 is translated (e.g., as part of a localization process), a term that should not be translated (e.g., "Microsoft®"), is partially translated into Japanese. In at least some embodiments, this partial translation violates a constraint set on the term that specifies that the term is not to be translated during localization.

The resource analysis scenario 200 also includes resource analysis results 214. In at least some embodiments, the resource analysis results can be generated by the reporting module 116 as a part of a resource analysis session implemented by the RAU 108. As illustrated, the resource analysis results include a flag for the translation 210 that indicates that localization may cause the resource 204 to visually overlap with the resource 206. As also illustrated, the resource analysis results include a flag for the translation 212 that indicates that a term associated with the resource 208 should not be translated and that localization may cause the resource 208 to be partially or completely translated.

Having described an example resource analysis scenario, consider now a discussion of some example graphical user interfaces that can be used to implement the RAU.

Example User Interfaces

Figure 3:
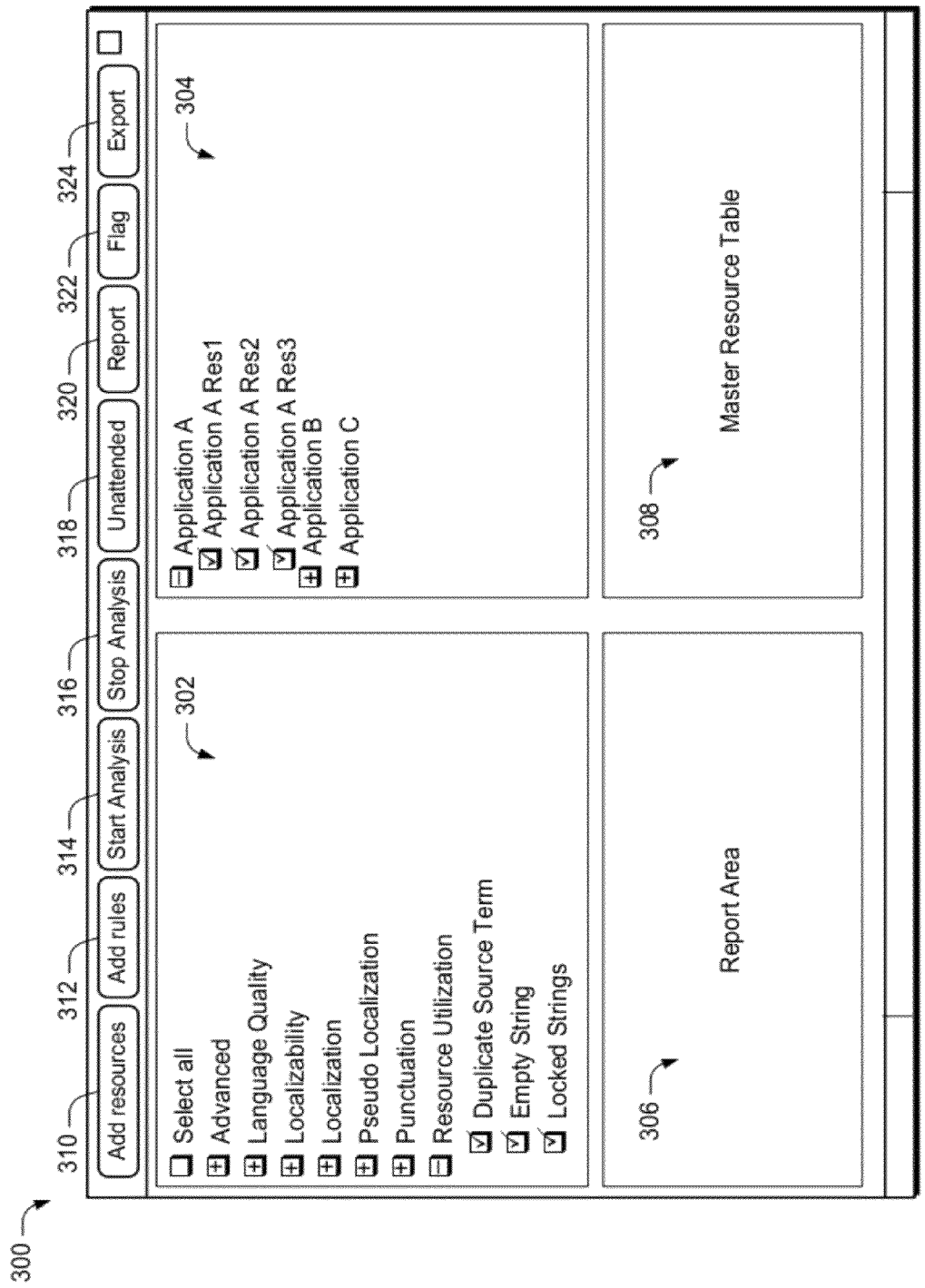
FIG. 3 illustrates a resource analysis utility graphical user interface in accordance with one or more embodiments.

FIG. 3 illustrates an example graphical user interface (GUI) that can be used to implement the RAU in accordance with one or more embodiments, generally at 300. GUI 300 includes a rules area 302 which can display rules and can be used to select rules to be used to analyze resources. Example rules are discussed in more detail below. The GUI 300 also includes a resource area 304 in which resources can be displayed and selected for analysis. As discussed above, the RAU can be implemented to analyze resources in a variety of different file types. Accordingly, in at least some embodiments, the resource area can enable resources associated with a variety of different file types to be selected. In addition, GUI 300 includes a report area 306 and a master resource table 308, each of which is discussed in more detail below.

In some example embodiments, the GUI 300 includes a variety of selectable controls that can be selected to access and/or initiate various functionalities of the RAU. For example, the GUI 300 includes an add resources control 310 that can be selected to cause the resources area 304 to be displayed. A user can then select resources from the resources area for analysis. The GUI 300 also includes an add rules control 312 which can be selected to cause the rules area 302 to be displayed for selection of rules to be used for resource analysis.

In at least some embodiments, the GUI 300 includes a start analysis control 314 and a stop analysis control 316 which can be selected, respectively, to start and stop a resource analysis process. Also included as part of the GUI 300 is an unattended control 318 that can be selected to indicate that a resource analysis session is to be run in an unattended mode. For example, in some embodiments the RAU can present one or more prompts during a resource analysis session (e.g., via a popup window) that request user input. In at least some embodiments, presenting a prompt can cause the resource analysis session to be paused until a user provides the requested input. If a user is not present to provide the requested input, this can prevent the resource analysis session from continuing until a user becomes aware of the prompt and provides the requested input.

Accordingly, in some embodiments the unattended control 318 can be selected to cause a resource analysis session to run without prompting a user for input during the session. For example, if the RAU requests input during a resource analysis session, the RAU can maintain default values that can be automatically used for the input without requesting user input. Thus, in at least some embodiments, the unattended mode enables all or part of a resource analysis session to be run without the presence of a user, e.g., without user input.

Also included as part of the GUI 300 is a report control 320 that can be selected to access reporting functionalities of the RAU. For example, selection of the report control can cause the report area 306, the master resource table 308, a statistics table (discussed below), a trend table, and/or any other suitable reporting functionality to be displayed. In at least some embodiments, a selection of the report control 320 can cause the results of a resource analysis session to be reported to a remote entity, e.g., the remote entities 126.

The GUI 300 also includes a flag control 322 and an export control 324. In at least some embodiments, the flag control 322 can be selected to cause resource files that are associated with potential problems to be flagged. For example, an analysis of a particular resource may determine that the resource may be improperly formatted after localization. Actuating the flag control can cause the resource to be visually highlighted in the GUI 300, e.g., as part of the report area 306 and/or the master resource table 308.

According to some embodiments, the export control can be selected to export the results of a resource analysis session. For example, the export control can be selected to cause the results to be exported to an external application, such as a spreadsheet application.

FIG. 4 illustrates the report area 306 in more detail, in accordance with one or more embodiments. In this example, report area 306 includes a number of columns that include information about a resource analysis session. For example, the report area includes a resource type column 400 that indicate types for the resources that were analyzed during a particular resource analysis session. In this particular illustrated embodiment, the resource types include tables and controls.

The report area also includes a file name column 402 that displays file names associated with the resources analyzed during a resource analysis session. For example, the file name column can include file names that were selected via the resource area 304. Also included in the report area is a target culture column 404 that lists cultures and/or languages that are associated with a resource analysis session. In this particular illustrated embodiment, the resources that were analyzed are associated with the Japanese culture. A rule column 406 included as part of the report area lists the rules that were used during the resource analysis session.

Also included as part of the report area is a result column 408 that lists resource analysis results. For example, the results can include an indication of potential problems that were detected during the analysis of a resource. In this particular example, the results include an indication that the first resource was properly localized and an indication of warnings associated with the other analyzed resources.

The report area also includes an explanation column 410 that can display various messages associated with resource analysis. For example, an explanation can include information about a particular resource analysis result indicated in the result column. In this particular example, the explanation column indicates that the first resource was correctly localized and also indicates information about the warnings provided for the remaining resources.

The columns included in the report area 306 are presented for purposes of example only, and in some embodiments, the report area can be configured to present a variety of different types of information. Examples of different types of information that can be presented via the report area include:
 a resource identifier;
 a date on which a resource was modified;
 a source string for the resource;
 a source type for the resource;
 a target string for the resource;
 an original untranslated version of the resource;
 a localization status of the resource;
 comments regarding the resource;
 other cultures associated with the resource;
 a priority associated with the resource;
 a log file path for an analysis associated with the resource; and
 the validity of the resource.

FIG. 5 illustrates the master resource table 308 in more detail, in accordance with one or more embodiments. The master resource table includes a variety of different information about resources. For example, the master resource table includes a resource type column 500 that indicates types for particular resources. A resource string column 502 includes information about resources in their original form, e.g., a resource before it has been localized.

The master resource table also includes an Arabic column 504 and a Japanese column 506. These columns each include translations of the resources indicated in the resource string column 502 into their respective languages. According to some embodiments, some resources and/or terms are designated as not to be translated during the localization process. As illustrated in this particular example, the term "Windows Live®" is designated as not to be translated during the localization process. In some embodiments the Master resource table enables a variety of different information about resources to be displayed and provides a visual indication of how the localization process can affect resources.

FIG. 6 illustrates a details table 600, in accordance with one or more embodiments. The details table is configured to display a variety of different details about resources and in at least some embodiments can be accessed and/or invoked via the GUI 300. In this particular example embodiment, the details table includes a resource column 602, an aspect column 604, and a value column 606.

The resource column includes descriptions of resources, such as text associated with a particular resource. In this particular example, the resource includes the text "Added a blog entry." The aspect column displays different aspects of resources that can be viewed via the details table. In at least some embodiments, aspects can include a translation of a resource and physical dimensions of a resource, such as a length of a resource, a width of a resource, a height of a resource, and so on.

The value column includes values for the aspects indicated in the aspects column. In this particular example, the value column includes a translation of the resource and the length, width, and height of the resource. In at least some embodiments, the length, width, and height refer to the size and/or placement of a resource (e.g., in millimeters) when it is displayed, e.g., as part of a user interface.

FIG. 7 illustrates a statistics table 700, in accordance with one or more embodiments. In at least some embodiments, the statistics table is configured to display a variety of different statistics about resources and in some embodiments can be accessed and/or invoked via the GUI 300. The statistics table includes a file name column 702 that includes filenames associated with particular resources. The statistics table also includes a resource type column 704 that indicates a type for each of the resources included in the statistics table.

A statistics field column 706 indicates the particular statistics that are being tracked via the statistics table. Also included as part of the statistics table are statistic values columns 708 and 710. The statistic values columns include values for the particular statistics being tracked by the statistics table for particular cultures and/or languages.

As an example implementation of the statistics table, consider a statistical analysis for resources 712. The statistical analysis is for a "word" resource type (e.g., a textual word) and the statistic being analyzed is how many of the resources 712 are localized, i.e., as indicated by "Localized" in the statistics field. The values included in the statistical values columns 708 and 710 indicate that 86 of the resources 712 were localized in Arabic and in Japanese. In at least some embodiments, discrepancies and/or variations indicated in the statistics table can indicate potential problems with a resource and/or a localization process. For example, a variation between cultures in a number of resources localized can indicate that some resources that should not be localized are in fact being localized, and vice-versa.

Figure 8:
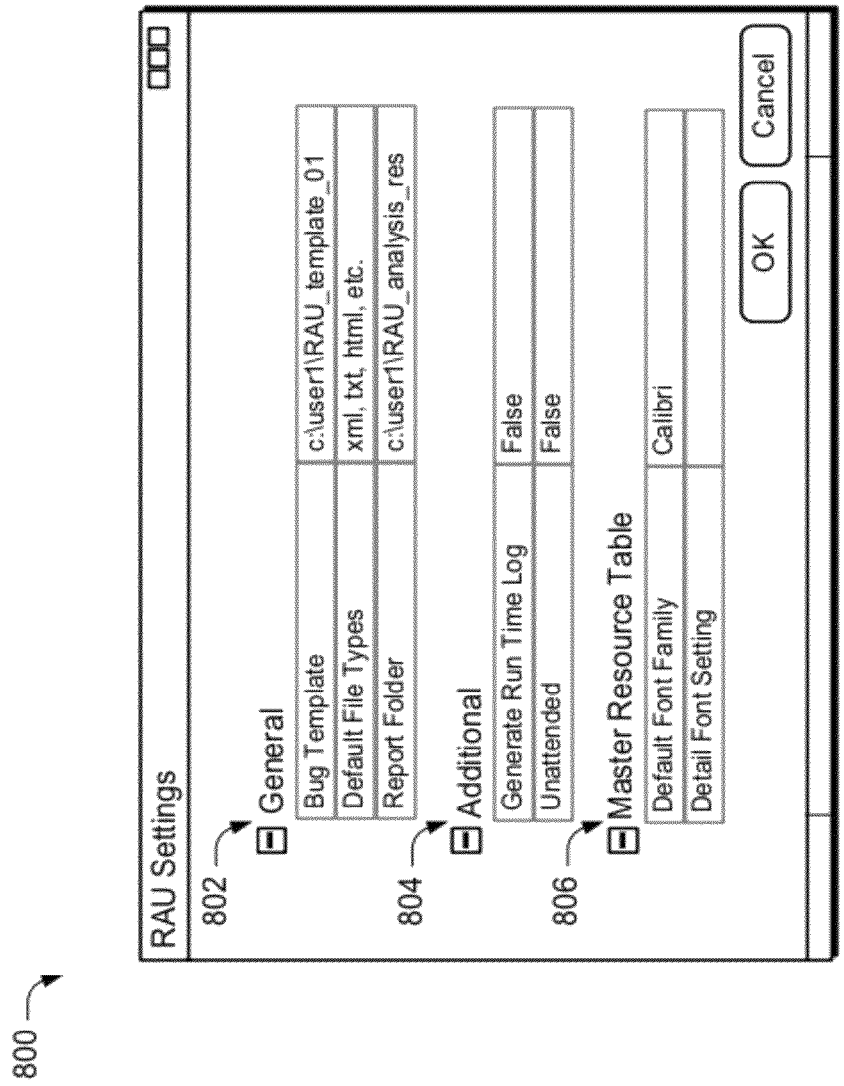
FIG. 8 illustrates an example graphical user interface in accordance with one or more embodiments.

FIG. 8 illustrates an example graphical user interface (GUI) that can be used to implement the RAU in accordance with one or more embodiments, generally at 800. In at least some embodiments, the GUI 800 can enable various settings associated with the RAU to be specified such that the settings can be applied for multiple resource analysis sessions without having to specify the settings for each session.

The GUI 800 includes a general settings region 802, an additional settings region 804, and a master resource table settings region 806. According to some embodiments, the general settings region 802 can enable various general settings for the RAU to be specified. In this particular illustrated embodiment, the general settings region enables a user to specify one or more default file types to be used during a resource analysis session, as well as a folder to which a report of the resource analysis session results can be saved.

In at least some embodiments, the additional settings region 804 can enable other various settings associated with the RAU to be specified. For example, in the illustrated example embodiment the additional settings region 804 includes an "Unattended" field where the unattended mode of the RAU can be turned on or off. The unattended mode of the RAU is discussed above in more detail.

According to some embodiments, the master resource table settings region 806 enables settings associated with a master resource table to be specified. For example, this particular illustrated embodiment enables a font family associated with a master resource table to be specified.

The settings and regions illustrated in GUI 800 are presented for purposes of example only, and other embodiments of the GUI 800 can include a variety of different parameters, settings, and fields that can be used to configure various aspects of the RAU.

The example GUIs and tables presented above are for purposes of example only, and a variety of different information can be presented associated with product localization. Examples of different information that can be presented include statistical deviations, data trends, historic analysis data, charts of analysis data, and so on. In at least some embodiments, some or all of this information can be presented via a single user interface.

Having considered example user interfaces in accordance with one or more embodiments, consider now an example implementation of the RAU via a command line interface.

Example Command Line Interface

Figure 9:
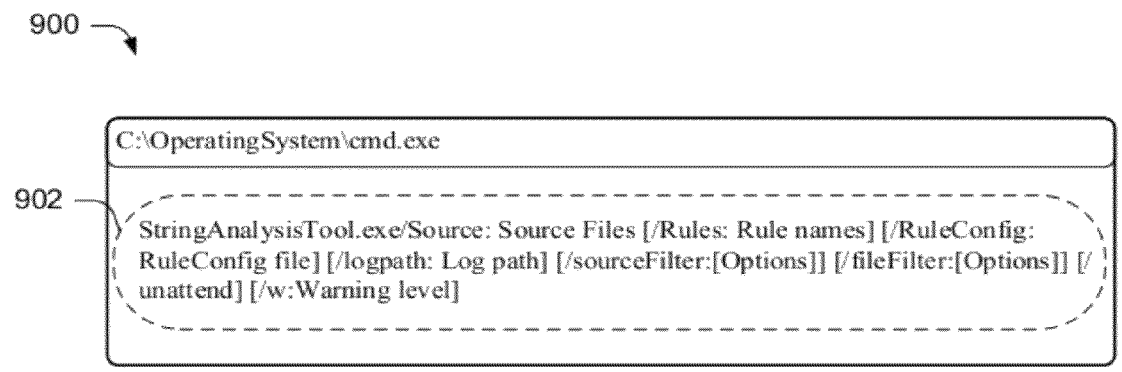
FIG. 9 illustrates a command line interface that can be used to implement a resource analysis utility in accordance with one or more embodiments.

FIG. 9 illustrates a command line interface 900 that can be used to implement the RAU, in accordance with one or more embodiments. In at least some embodiments, the command line interface can be used to invoke the RAU and to set up and run a resource analysis session via the RAU. The command line interface includes example command line parameters 902 that can be used to configure the RAU for resource analysis. Each of the example command line parameters are discussed in Table 1 below, in accordance with one or more embodiments.

TABLE 1

| Parameter | Function |
| --- | --- |
| help | Display the help message. |
| source | Indicate the resources (e.g., files and/or folders) to be tested. |
| rules | The rules to be run on the selected resources. This command can be followed by one or more rule names. According to some embodiments, by default all available rules will run unless specific rules are specified here. |
| RuleConfig | Using this parameter, rules can be enabled or disabled and then run. If the "/Rules" parameter discussed above is utilized, in some embodiments the "/RuleConfig" parameter can be skipped. The rules to be run for analysis can be indicated by setting the 'Enabled' tag in RulesConfig.xml. In some example embodiments, '1' indicates that a rule is enabled and '0' indicates that a rule is disabled. |
| logpath | This parameter can indicate a location for saving the results of resource analysis. In some embodiments, if a location is not specified, the results can be saved to a default location. For example, a folder named "Analysis Result" can be created in working folder and the results saved to that folder. |
| sourceFilter | This parameter can be used to tag specific resources that are to be analyzed. In some embodiments, RAU will run the rule on all source strings by default. Example Options: N: Run SAT only on the strings that are not localized. L: Run SAT only on localized strings. |
| /FileFilter | In some embodiments, this tag can be set to on so that RAU only checks indicated file formats. In at least some embodiments, one or more file formats can be input. If this tag isn't set, in some embodiments RAU will check all supported file formats. In at least some embodiments, if only '/FileFilter' is provided and/or some invalid options are provided, RAU will run all the supported file formats by default. Example Options: lcl: Run SAT only on .lcl files edb: Run SAT only on .edb files lspkg: Run SAT only on .lspkg files resx: Run SAT only on .resx files rcxml: Run SAT only on .rcxml files all: Run SAT on all supported files |
| /unattend | In some embodiments, this parameter can be set to "yes" or "no" if user input may be requested. For example, this parameter can be set to "Yes" to allow the RAU to run in silent mode and without presenting prompts for user input. In some embodiments, by default a user will provide input when the process requests it. |
| /w | In some embodiments, a warning level threshold can be specified (e.g., <0-4>). For example, in some embodiments if a warning level is specified, only errors that meet or exceed to specified warning level will be logged. In at least some embodiments, a default warning level can be specified. |

In at least some embodiments, after the command line parameters have been set, a user can run the command line parameters to cause the RAU to analyze a selected set of resources.

Having considered an example command line interface in accordance with one or more embodiments, consider now some example methods in accordance with one or more embodiments.

Example Methods

Figure 10:
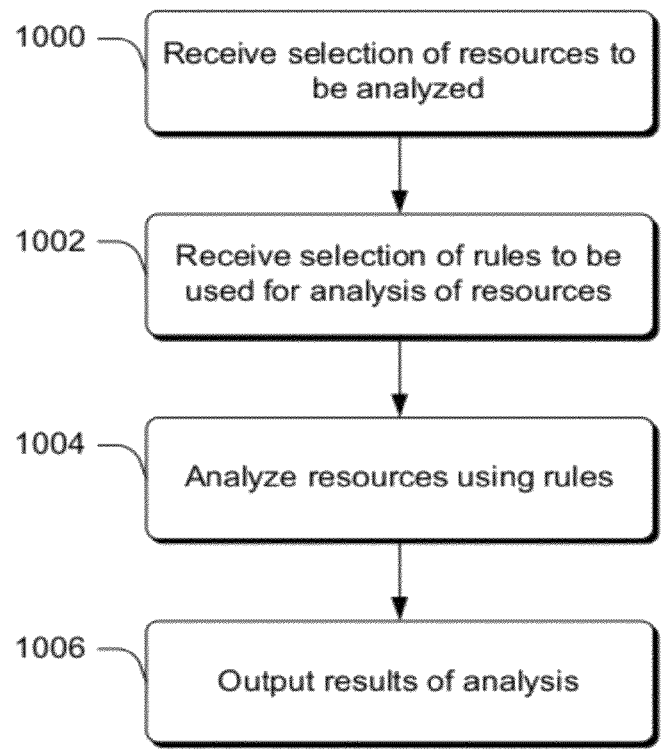
FIG. 10 is a flow diagram that describes steps in a method in accordance with one or more embodiments.

FIG. 10 is a flow diagram that describes steps a method in accordance with one or more embodiments. The method can be implemented in connection with any suitable hardware, software, firmware, or combination thereof. In at least some embodiments, the method can be implemented via a resource analysis utility, such as the one described above.

Step 1000 receives a selection of resources to be analyzed. Examples of resources are discussed above and below. In at least some embodiments, resources can be selected via a GUI and/or by specifying resources via a command line interface. Step 1002 receives a selection of rules to be used for analysis of the resources. Additionally or alternatively, a default set of rules can be run if no specific rules are selected. According to some embodiments, the rules can be selected via a GUI and/or by specifying rules via a command line interface. In at least some embodiments, the rules to be run for a resource analysis can be selected prior to a selection of the resources to be analyzed.

Step 1004 analyzes the selected resources using the selected rules. Step 1006 outputs results of the analysis. In at least some embodiments, the results of the analysis can be output via the report area 306, the master resource table 308, the details table 600, the statistics table 700, and/or a command line interface (e.g., the command line interface 900).

Figure 11:
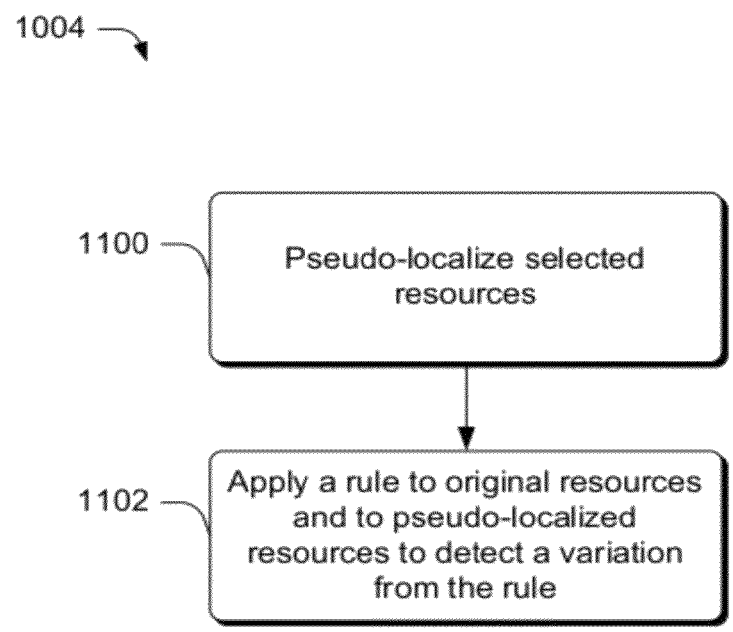
FIG. 11 is a flow diagram that describes steps in a method in accordance with one or more embodiments.

FIG. 11 is a flow diagram that describes step 1004 of FIG. 10 in more detail in accordance with one or more embodiments. Step 1100 pseudo-localizes the selected resources. In at least some embodiments, pseudo-localizing a resource can include applying an algorithm to the resource that determines the form, structure, and/or appearance of the resource upon localization and generates a pseudo-localized version of the resource. For example, pseudo-localization of a resource can include translating the resource from one language to a different language. In at least some embodiments, pseudo-localization can include an analysis of the original resources (e.g., in English) to ensure that the resources are localizable and/or do not include errors such as spelling errors, formatting errors, and so on.

Step 1102 applies a rule to the original resources and to the pseudo-localized resources to detect a variation from the rule. In at least some embodiments, applying rules to the original resources and to the pseudo-localized resources can include detecting a pattern associated with the resources and determining if the pattern varies across any of the resources. Example rules and patterns are discussed below in Table 2. For example, a particular rule can determine that an original resource includes a URL but a pseudo-localized resource does not include a URL. This can cause the pseudo-localized resource to be flagged as a potential problem. In at least some embodiments, rules can be applied to detect patterns and/or pattern variations for a resource in multiple different languages and/or cultures in a single resource analysis session.

Figure 12:
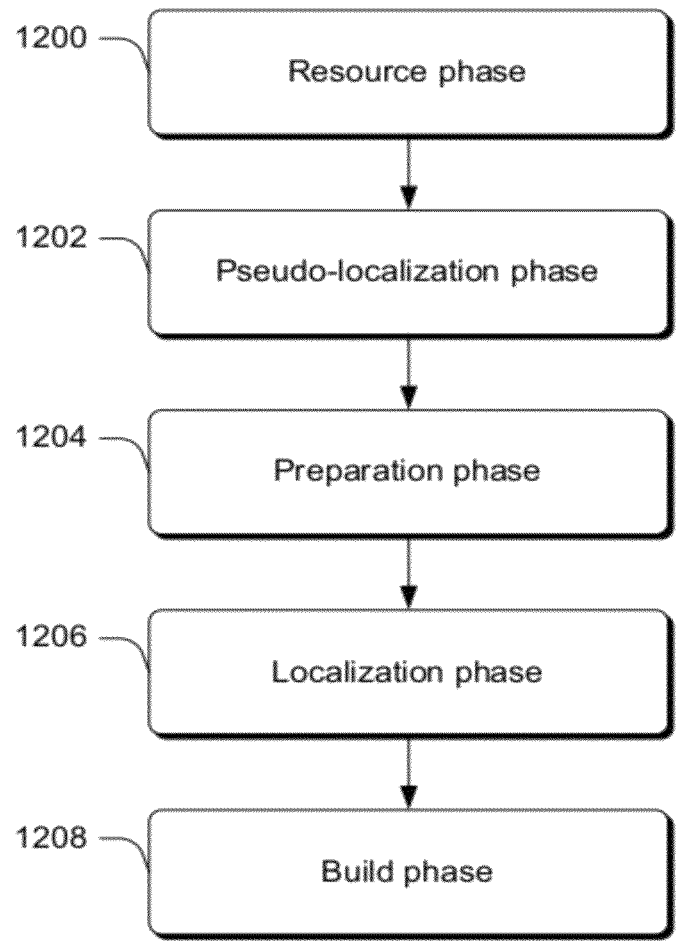
FIG. 12 is a flow diagram that describes steps in a method in accordance with one or more embodiments.

FIG. 12 is a flow diagram that describes example steps that can occur during a product development cycle in accordance with one or more embodiments. In at least some embodiments, the RAU can be employed during and/or between the various steps of the product development cycle to analyze resources. According to some embodiments, the RAU can determine if resource problems exist with a resource and/or if potential problems may occur with a resource during the product development cycle.

Step 1200 is a resource phase of the example product development cycle. During the resource phase, resources can be developed and/or gathered prior to implementation in the actual code of a product. In at least some embodiments, the RAU can be utilized during the resource phase to detect problems with individual resources and to ensure that resources are appropriately commented such that the resources can be accurately translated into different languages and can be correctly integrated into a product. In at least some embodiments, the RAU can be used during the resource phase to determine if a resource can be correctly localized.

Step 1202 is the pseudo-localization phase of the example product development cycle. During the pseudo-localization phase, determinations can be made if resources are capable of being localized and if the localization process may cause a resource to fail, e.g., a loss of resource integrity due to localization. In at least some embodiments, the RAU can be utilized during the pseudo-localization phase to determine if a resource is capable of being localized and to determine if the localization process may cause a problem with the resource. For example, consider a resource that is associated with a GUI element such as a dialog box, a control, a text element, and so on. It is possible that during localization, display-related problems can occur such as truncation of the GUI element, clipping of the GUI element, overlap of the GUI element with a different GUI element, and so on. Additionally, the presence of improper code or language-neutral content that can cause product breakage in different languages can be detected. In at least some embodiments, the RAU can detect these problems and cause the resource associated with the GUI element to be flagged. A developer or other entity can then take appropriate actions to mitigate these problems, such as changing the resource itself and/or commenting the resource such that during localization, steps can be taken to prevent these problems.

Step 1204 is the preparation phase of the example product development cycle. During the preparation phase, resources are validated as being ready for localization. In at least some embodiments, the RAU can be utilized during the preparation phase to determine if resources are consistent across multiple languages and/or to determine that if are improper variances in resource count, resource content, resource structure, and so on.

Step 1206 is the localization phase of the example product development cycle. During the localization phase, resources are put through the actual localization process to ready the product for a particular culture and/or language. In at least some embodiments, the RAU can be utilized as part of the localization phase to determine if terms are used consistently across different cultures and/or languages and to make sure that resources that are intended for localization are actually localized and that resources that are not intended for localization are not localized. According to some embodiments, the RAU can be utilized as part of the localization phase to determine if localization will have an undesirable impact on the visual appearance and/or usability of a product.

Step 1208 is the build phase of the example product development cycle. During the build phase, localized resources are integrated into the final product. In at least some embodiments, the RAU can be utilized as part of the build phase to determine if a localized resource may cause the final product to fail and/or if the build process may cause a resource to fail. According to some embodiments, the RAU can also be implemented to statistically analyze resources across multiple cultures and/or languages during the build process. The statistical analysis can include word counts associated with resources, resource types associated with resources, size dimensions associated with resources, and so on. The statistical analysis can then be used to determine if unexpected variances exist that may indicate a problem with a resource and/or the final product. According to some embodiments, the RAU can also be utilized as part of the build phase to determine if resources and/or the final product are able to be processed by language-neutral scripts to generate visual elements, e.g., a GUI.

Accordingly, in at least some embodiments the techniques and tools discussed herein (e.g., the RAU) can be utilized before, during, and/or after the various steps of a product development cycle to analyze resources and determine if problems with a particular resource exist and/or if problems may occur when a resource is integrated into a particular product, e.g., during the localization phase.

Having considered some example methods in accordance with one or more embodiments, consider now some example rules that can be used to analyze resources in accordance with one or more embodiments.

Example Rules

Table 2 below includes example rules that can be utilized to analyze resources in accordance with one or more embodiments. Table 2 is not intended to be an exhaustive list of rules, but is presented for purposes of illustration only. Additionally, the rule names, categories, descriptions, search patterns, examples, and formats are not intended to be limiting, but are presented for purposes of ease of understanding.

TABLE 2

| Rule Name | Description | Search Pattern (Example Resource Failure) | Example | Example Formats |
|---|---|---|---|---|
| colspan="5" Category: Pseudo Localization | | | | |
| Pseudo Numbers | Detects number strings in the source that have been pseudo localized in the translation. | If source string is only numbers and translation is not only numbers | Source: 2 Target: 漾漾ミ漾穴 噂ゼ啓2！ | lcl lspkg, edb |
| Pseudo Tokens | Detects XML/HTML tags in the source that have been pseudo localized in the translation. | If translated XML/HTML tag does not match source | | lcl lspkg, edb |
| SkipTextInside Brackets | Skip text inside ({{ ... }}) | If string inside placeholder appears in source string AND doesn't appear in the target string AND it appears in placeholder specs, rule is set to indicate failure | Don't translate text inside placeholder ({{ ... }}) | lcl lspkg, edb |
| Pseudo Delimiters | Detects start and end delimiters in the target string of the pseudo localized term. | If target string is missing the starting and ending (e.g., or ）). | Expected target string: text Tagged as failure: text or test or text | lcl, edb, lspkg, resx, rcxml |
| colspan="5" Category: Localizability | | | | |
| NonStandard Placeholder | Scans for non-standard placeholders and matching comments. | If source contains a non-standard placeholder but lacks matching comments. | Source: Vendor{21150} Comments: RCCX: Name = idsAthenaTitle FeatureName = MSOE | All |
| URL | Scans source strings for URLs and looks for identical matching comments. | If source has a URL and comments do not contain URL. | Source: http://feedback.live.com/ Comments: RCCX: Name = idsHelpMSWebFeed | All |
| colspan="5" Category: Comments | | | | |
| CodeReference | Identifies coding references such as a function call or name. | If source contains the pattern of a function call or name and comments do not contain matching function. | Source: SpinNumSubj Comments: null | All |
| Concatenation | Looks for concatenation (e.g., :,; -! etc) in the source string and matching comments. | If source contains concatenation and comments lack same character. | Source: To help prevent your messages from being identified as possibly fraudulent: Message: Comments are missing context for the ':' symbol listed in the source. | lcl, lspkg, edb |
| ContainsEmail | Detects the presence of an email address and associated comments. | If source contains email and comments do not contain the exact same email | Source: example555@hotmail.com Comments: RCCX: Displayed under the ID | All |

TABLE 2-continued

| Rule Name | Description | Search Pattern (Example Resource Failure) | Example | Example Formats |
|---|---|---|---|---|
| ContainsGlink | Checks for the presence of a g-link (http://hotmail.live.com\en-us\) and related comments. | If source contains a g-link and comments do not contain the exact same g-link. | combo box.<br>Name = IDS_EXAMPLE_LIVE_ID<br>FeatureName = FSUI<br>Source:<br>http://g.msn.com/5meen_us/122<br>Comments:<br>RCCX:<br>Name = IDS_MSNMSGR_UPGRADE_URL<br>FeatureName = Common | All |
| ContainsTokens | Looks for comments on detected items contained within brackets < > for both XML (generic) and HTML (specific). | If source contains either XML or HTML tags and no comments match detected tags. | Source:<br><font face = "Arial" >Your Secure Receipt:</font><br>Comments:<br>null | lcl, lspkg, edb |
| NonConforming Comments | Flags an error when the comments words countless that the limitation words count value (Example default value is 0). | If comments words count less than the limitation words count value(Default value is 0). | Source:<br>Receipts<br>Comments:<br>null | All |
| GenderString | Looks for matches from GenderString.xml in source string that are absent in comments. | If words from GenderString.xml are in source and not listed in comments. | Source:<br>Female<br>Comments:<br>null<br>Message:<br>Gender string in source string but no comments on them.<br>Matches: Female; | All |
| NumberStrings | Flag source strings that contain a number value but do not contain a matching comment. | If source contains a numerical value and comments do not match the numeric value. | Source 19<br>Comments:<br>null<br>Message:<br>Source string contains number string(not placeholder) and missing comments on number string.<br>Matches: 19 | All |
| Placeholders | Scans for placeholders in the source string and matching comments. | If source has placeholder and placeholder not in comments. | Source: All items will be deleted. Are you sure you want to empty {0}? ({1} item)<br>Comments:<br>Dev: Text to be displayed on Empty Folder page as user prompt for emptying a folder with a single email.<br>Message:<br>Source string has placeholder which is not referenced in | All |

TABLE 2-continued

| Rule Name | Description | Search Pattern (Example Resource Failure) | Example | Example Formats |
|---|---|---|---|---|
| | | | the comments. Matches: {0}; {1}; | |
| | | Category: Resource Utilization | | |
| DuplicateSource Term | Searches for multiple instances of the exact same source string. | If source string for id X is the same as id Y (or any other). | Source: Vendor Mail Message: String is duplicate of the following strings in the same LocStudio table: ["STR"; 21159]; | lcl, lspkg, edb |
| DupSourceAnd Target | Searches for multiple instances for both the exact same source string and translation. | If source string and translation for id X is the same as id Y (or any other). | Source: Move to junk e-mail Translation: نقل إلى البريد الإلكتروني غير الهام Message: Source term and target string is duplicate of the following strings in the same LocStudio table: ["STR"; 42593]; | lcl, lspkg, edb |
| EmptyString | Finds where the source or target contains text but the other does not. | If source/target is null and the other target/source is not null. | Source: server. Comment: null | All |
| LockedStrings | Flags strings that are marked as locked. | If Dev, UserSource, or UserTranslation is locked. | User Src Lock: Yes OR Dev Src Lock: Yes OR User Trans Lock: Yes | lcl, lspkg, edb |
| NonTranslatable Strings | Detects strings which are typically non-translatable | If source contains non-translatable | Source: , or _ or . . . or + or, or; or | All |
| SameTranslation | Looks for the same translation across multiple strings. | If target string for id X is the same as the string for id Y. | Source: server (instance 1). Source: server (instance 2) | lcl, lspkg, edb |
| Spaces | Detects spaces in the starting of a source string. | If source has a starting space. | Source: Text (space before text) | All |
| UnusedStrings | Looks for null values for both source and target. | If source is null and target is null. | Source: null Target: null | lcl, lspkg, edb |
| | | Category: Localization | | |
| LocalizationForbiddenbyDev | Looks for comments that indicate the source string has localization restrictions. | If comments contain words indicating localization limits (such as do not'). | Source: Go to space on Vendor Spaces Comment: RCCX: Do not localize | All |

TABLE 2-continued

| Rule Name | Description | Search Pattern (Example Resource Failure) | Example | Example Formats |
|---|---|---|---|---|
| MatchesPrevious | Identifies if the source or target match the previous translation. | If Source (or Target) matches Previous and not each other. | 'Vendor' Source: Server Target: Desktop Previous: Desktop | lcl, lspkg, edb |
| OverLocalized | Searches for terms in a source string matching a string from 'NonLocalizedPatterns.xml'. | If source contains a NonLocalizedPattern and target words appear translated. | Source: Vendor Corporation Target: *Mi¢røsøft Çõrpõrãtîõñ* | All |
| PartlyNotLocalized | Looks for partial matches between source and target strings. | If part of target string matches a word in the source string. | Source: Add to Messenger Target: Messenger に追加+ | All |
| TranslationOrNot | Looks for identical matches between the source and target strings. | If full source matches full target string. | Target Culture: ZH-CHS Source: beta Target: beta | All |

Category: Language Quality

| Rule Name | Description | Search Pattern | Example | Example Formats |
|---|---|---|---|---|
| NotLocalized | Detect non-localized strings in source file. | If TextLocStatus ! = Localized | Returns strings where TextLocStatus is NotLocalized, Updated or NotApplicable. | lcl, lspkg, edb |
| NotPreApproved | Detect non-preapproved strings in source file. | If ApprovalStatus ! = PreApproved | Returns strings were ApprovalStatus is Approved, NotReady, Failed, ForResearch, NotApplicable, Postponed, Won't Fix | lcl, lspkg, edb |
| BinaryNotLocalized | Detect non-localized strings (using BinaryLocalizationStatus) in source file. | If BinaryLocStatus ! = Localized | Returns resources where BinaryLocStatus is NotLocalized, Updated or NotApplicable | lcl, lspkg, edb |
| BinaryToDO | Detect BinaryLocStatus and Localization status are not applicable. | If BinaryLocSTatus ! = NotApplicable and TextLocStatus ! = Not Applicable | Returns resources where both BinaryLocStatus and TextLocStatus are both not applicable. | lcl, lspkg, edb |

Category: Integrity

| Rule Name | Description | Search Pattern | Example | Example Formats |
|---|---|---|---|---|
| BrokenPlaceholder | Identifies broken or incorrect content of placeholders (such as (){ }[ ]<>%1%a) that were detected in source. | If source contains placeholder and translation does not. | Source: Sorry, we were unable to sign you in to {21151} at this time. Please try again later. Target: | All |

TABLE 2-continued

| Rule Name | Description | Search Pattern (Example Resource Failure) | Example | Example Formats |
|---|---|---|---|---|
| | | | 很抱歉，我們目前無法將您登入 {10203}. 請稍後重試. | |
| ExtraLineBreaker | Checks for additional line break (\n) characters in translation. It doesn't check for '\n' strings (as MissLineBreaker does), but for additional <ENTER>s inserted in the translation. | Target contains more line break characters than source. | Source: Line 1 Line 2 Line 3 Target: Line 1 Line 2 Line 3 | All |
| DuplicateHotkey | Detects duplicate hotkeys in the same space (source/target) and within the same namespace (menu, dialog, and string). | If the same hotkey exists for a string within the same namespace such as menu, dialog, string. | Source: &Configure Message: Source string hotkey(&C) is duplicate to this source in following source ID: ["WIN_DLG_CTRL_", 130; 3522]; | lcl, lspkg, edb |
| InconsistentNumbers | Checks if source and target contains the same number of numbers. | Target contains more or less numbers than source. | Source: 1234 Target: cat | All |
| LocalizedHTMLAttributes | Looks for translated HTML attributes such as left, right, and center. | If Source Type = HTML and Resource ID contain Attr and Target does not match Source. | ResourceID: Attr SourceType: HTML Source: RIGHT Target: Desno | All |
| OverLocalizedFontNames | Check for over localized font names in the translation. | If Source contains font names (e.g.: Arial, Times New Roman, etc.) and Target doesn't contain one or more of those names. | Source: Some string with font name: Arial Target: 我們目前無法將您 | All |
| DuplicateSourceID | Identifies duplicate SourceIDs in the same resource file. | If SourceID (instance 1) matches SourceID: (instance 2+). | SourceID: 1234 (instance 1) SourceID: 1234 (instance 2) | All |
| InconsistentShortCut | Detects if the source or translation has a mismatched shortcut (alt, del, ctrl, etc). | If source (or target) contain a shortcut and the other does not contain an identical match. | Source: Week (or Ebaki (Ktrl + X)) Target: Sedmica Ctrl + Shift + 3 (or Auto) | lcl, lspkg, edb |
| MissHotkey | Identifies missing hotkeys (&) in either the source or target. | If a hotkey (&) exists in only the source or target. | Source: &Search (or Save as) Target: Cerca (or 繰り返し記号(&P):) | lcl, lspkg, edb |
| OverLocalizedHotkey | Looks for hotkeys that appear to be over localized by auto translation. | If Source contains hotkey and Target appears to | Source: &Unblock Target: 取消阻止(U) | lcl, lspkg, edb |

TABLE 2-continued

| Rule Name | Description | Search Pattern (Example Resource Failure) | Example | Example Formats |
|---|---|---|---|---|
| MissLineBreaker | Identifies missing lineBreaker (\r\t\n) in either the source or target. | contain additional hotkey information. If a LineBreaker(\r\t\n) exists in only the source or target. | (&U) Source: \r\n\t Target: \r\n | All |
| IdenticalToken | Looks for multiple uses of the same token. | If a single token (like {0}) appears more than once. | Source: {0} of {0} Comments: Dev: like 11 of 11 | All |
| Category: Punctuation | | | | |
| InconsistentPairing | Identifies some punctuation in target or source string not in pair, such as ( ){ }[ ]. | Some punctuation should in pair in some culture. | Source: {Placeholder Target: {Placeholder { | All |
| UnEven | Identifies some punctuation in source string that is not translated properly. | Some punctuation should be carried over in some cultures. | Source: "" ' ' Target: "" ' | All |
| AppearanceInTranslation | Identifies some punctuation in source string should not appear in translation, | Some punctuation should not appear in translation in some culture. | Source: Are you Ok! Target: 你还好吗?!( Chinese should not use '?', should use '!'.) | All |
| LastPunctuationMismatch | Identifies miss match last punctuation between source and target string. | Last punctuation should match between source and target in some culture. | Source: Are you Ok? Target: 你还好吗! | All |
| SpaceBeforePunctuation | Identifies whether some space before punctuation. | Space should not before some punctuation. | Source: Are you Ok? Target: 你还好吗 ! | All |
| AbsenseOfSpaceAfterPunctuation | Identifies some punctuation in target or source string not have space followed. | Some punctuation should followed by space in some culture. | Source: Are you Ok? Target: 你还好吗! (Last exists a space.) | All |
| MoreThanOneContiguousSpaces | Identifies whether there exists more than one space in target string. | More than one space should not appear in translation. | Source: Are you Ok? Target: 还好吗! (More than 1 space.) | All |
| ExtraPunctuation | Detects extra punctuation in the target string. | Checks if Target String contains extra punctuation when compared to the source string. | Source: Hello! Target: Hello!!!!! | All |
| Category: Advanced | | | | |
| LengthComparison | Looks for translated strings that are X times longer (where X can be set). | If target is X times longer than source string. | Source: Privacy Target: Beskyttelseaf personligeoplysninger | All |
| StringLengthLimit | Determines if a localized string is greater than a specified length. | If target has more than X characters. | | All |

TABLE 2-continued

| Rule Name | Description | Search Pattern (Example Resource Failure) | Example | Example Formats |
|---|---|---|---|---|
| SearchString | Looks for matches in a variety of locations (comments, sourceid, source, and target). | If string contains a match as inputted in specified location (comment, ID, source, or target). | Based on what you input in the SearchOption section of the Rule tab while 'SearchString' is selected | All |
| SpellingError | Looks for English spelling errors against the source string. | If source string contains a mis-spelled English word. | Source: Tst Correction: Test | lcl, lspkg, edb |
| CheckConformance | In some embodiments, this check is a pre-requisite for all the rules. This rule has to pass before any other rules to run. | | | resx |
| DeadResources | This rule checks for references to the resources within an application source codes and lists all resource IDs, which don't appear in input resx/rcxml files. | | | resx, rcxml |
| MissingEntry | Detect missing entry between local and source resx files. | | | resx, rcxml |
| Category: Globalization | | | | |
| LocaleSensitive | Looks for strings related to culture such as LCID, LLCC, markets (en-us) or terms which are locale sensitive. | If source, sourceid, or comments contain a string which is deemed locale sensitive. | Source: http://join.msn.com/?pgmarket=en-us&page=hotmail/options Message: Source string references culture name: en-US, culture: English (United States). | All |
| LineBreaker | Looks for line breakers (like \n\r) and for comments associated with them. | If source contains a line breaker and comments do not match it. | Source: The selected video could not be accessed from the service\r\n due to heavy service usage. Please try again. Comments: null | All |
| FileName | Flags strings which look like a filename or filepath and missing comments. | If source contains a filename or filepath and comments do not match string. | Source: oestyle.css Comments: null | lcl, lspkg, edb |
| DateTimeForm | Scans source for Date Time style strings and for exact matching comments. | If source contains Date Time format and comments lack matching string. | Source: d MMM, dddd Comments: RCCX:DS_NAVTREE_DAYFORMAT | lcl, lspkg, edb |
| FindAllHotkey | Finds and lists all the hotkeys present in the source file. | If source contains a hotkey, list the string. | Source: contains hotkey denoted by & or & | Lcl, lspkg, edb |

Having described rules that can be utilized in accordance with one more embodiments, consider now an example system that can be utilized to implement one or more embodiments.

Example System

FIG. 13 illustrates an example computing device 1300 that can be used to implement the various embodiments described above. Computing device 1300 can be, for example, computing device 102 and/or one or more of remote entities 126 of FIG. 1.

Computing device 1300 includes one or more processors or processing units 1302, one or more memory and/or storage components 1304, one or more input/output (I/O) devices 1306, and a bus 1308 that allows the various components and devices to communicate with one another. Bus 1308 represents one or more of any of several types of bus structures, including a memory bus or memory controller, a peripheral bus, an accelerated graphics port, and a processor or local bus using any of a variety of bus architectures. Bus 1308 can include wired and/or wireless buses.

Memory/storage component 1304 represents one or more computer storage media. Component 1304 can include volatile media (such as random access memory (RAM)) and/or nonvolatile media (such as read only memory (ROM), Flash memory, optical disks, magnetic disks, and so forth). Component 1304 can include fixed media (e.g., RAM, ROM, a fixed hard drive, etc.) as well as removable media (e.g., a Flash memory drive, a removable hard drive, an optical disk, and so forth).

One or more input/output devices 1306 allow a user to enter commands and information to computing device 1300, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer-readable storage media".

"Computer-readable storage media" include volatile and non-volatile, removable and non-removable media implemented in any method or technology for storage of information such as computer readable instructions, data structures, program modules, or other data. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

Various embodiments provide techniques for analyzing resources based on a set of rules to determine problems that may occur during a product development cycle. In accordance with some embodiments, resources can include files, strings, images, text, user interface elements (e.g. controls, radio buttons, and/or windows), and so on. For example, a resource for a software product can include a selectable control that is included as part of a graphical user interface for the software product.

In at least some embodiments, a resource analysis utility ("RAU") is provided that can load resource files and analyze associated resources according to a set of rules. According to some embodiments, the RAU includes a graphical user interface ("GUI") that enables resource files to be selected and rules to be selected that are to be used to analyze the resource files. The GUI can also include results of the analysis of the resource files. For example, the GUI can display a table that includes the resource files that were analyzed, the rules that were used to analyze the resource files, problems that were detected during the analysis, and so on.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device comprising:
one or more processors; and
one or more computer-readable storage media embodying computer readable instructions including:
a resource analysis utility that is configured to:
enable selection of multiple resources;
analyze the multiple resources according to one or more localization rules to determine if one or more localization problems exist with the multiple resources, the localization rules having one or more conditions and being configured to detect a pattern associated with the multiple resources;
generate one or more pseudo-localized versions of the multiple resources; and
determine a pattern variation across the one or more pseudo-localized versions of the multiple resources;
a graphical user interface (GUI) that enables resource files to be selected and rules to be selected that are to be used to analyze the resource files; and
a reporting module that is configured to output localization results in a plurality of languages for one or more of the multiple resources, the localization results being a report displayable in the GUI responsive to selection of a report control configured to present a plurality of reporting functionalities.

2. The device of claim 1, wherein the multiple resources comprise one or more of a string, an image file, a text file, or a user interface element.

3. The device of claim 1, wherein the one or more localization rules are configured to be implemented by the resource analysis utility to detect pattern variation in one or more pseudo-localized versions of the multiple resources.

4. The device of claim 1, wherein the reporting module is further configured to output a details table that includes one or more physical dimensions of a localized version of one or more of the multiple resources.

5. The device of claim 1, wherein the localization results comprise a translation of the multiple resources in the plurality of languages.

6. The device of claim 1, wherein the reporting module is further configured to output a report that includes an indication of the one or more localization problems and an explanation of the one or more localization problems.

7. The device of claim 1, wherein the reporting module is further configured to output a statistics table that includes statistics associated with the localization results.

8. The device of claim 7, wherein the statistics comprise a number of the multiple resources that were localized in a plurality of different languages.

9. A computer-implemented method comprising:
receiving, via a graphical user interface, a selection of multiple resources to be analyzed;
receiving, via the graphical user interface, a selection of one or more localization-based rules to be used to analyze the multiple resources;
analyzing the multiple resources to determine if one or more of the multiple resources violate the one or more localization-based rules, the localization-based rules having one or more conditions and being configured for detecting a pattern associated with the multiple resources;
generating one or more pseudo-localized versions of the multiple resources; and
determining a pattern variation across the one or more pseudo-localized versions of the multiple resources.

10. The computer-implemented method of claim 9, wherein the one or more localization-based rules are configured to detect a pattern across localized versions of the multiple resources.

11. The computer-implemented method of claim 9, wherein analyzing the multiple resources comprises applying the one or more localization-based rules to localized versions of the multiple resources.

12. The computer-implemented method of claim 9, further comprising outputting localized versions of the multiple resources.

13. A computer-implemented method comprising:
pseudo-localizing, using a computing device, one or more resources to generate pseudo-localized versions of the one or more resources, wherein pseudo-localizing a resource comprises applying an algorithm to the resource that determines a form, structure, and/or appearance of the resource upon localization;
applying a rule to the one or more pseudo-localized versions to detect a variation from the rule in the one or more pseudo-localized versions, the rule having one or more conditions;
detecting a pattern associated with the multiple resources; and
determining a pattern variation across the one or more pseudo-localized versions of the multiple resources.

14. The computer-implemented method of claim 13, wherein the one or more pseudo-localized versions comprise translated versions of the one or more resources.

15. The computer-implemented method of claim 13, wherein the rule indicates one or more patterns associated with resource localization.

16. The computer-implemented method of claim 15, wherein the one or more patterns comprise an indication of a physical dimension of the pseudo-localized versions.

17. The computer-implemented method of claim 13, wherein the variation from the rule indicates a display-related problem associated with the one or more resources, the display-related problem comprising one or more of a truncation of one or more of the pseudo-localized versions, a clipping of one or more of the pseudo-localized versions, or an overlap of one or more of the pseudo-localized versions.

18. The computer-implemented method of claim 13, further comprising outputting the pseudo-localized versions and an explanation of the variation from the rule in the one or more pseudo-localized versions.

19. The computer-implemented method of claim 9, wherein the multiple resources comprise one or more of a string, an image file, a text file, or a user interface element.

20. The computer-implemented method of claim 9, wherein the pseudo-localized versions of the multiple resources comprise a translation of the multiple resources into a plurality of languages.

* * * * *